June 17, 1969    J. L. JOLY    3,450,828
TERMINAL PIECE FOR THE CONNECTION OF ELECTRICAL CABLES
Filed Oct. 17, 1966
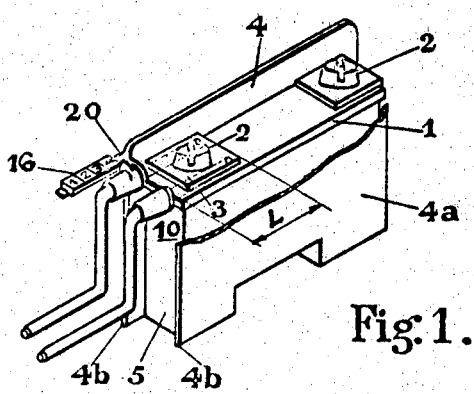
Fig. 1.
Fig. 2.     Fig. 3.
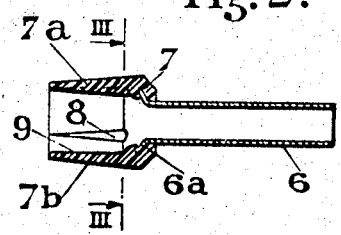    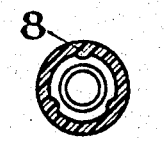
Fig. 4.    Fig. 5.
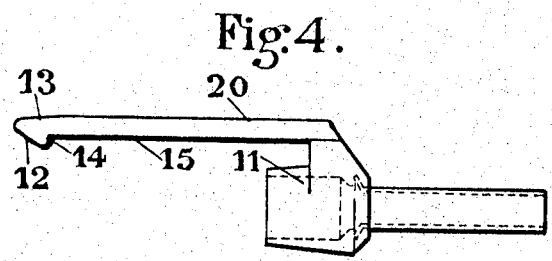    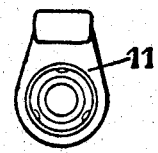
Fig. 6.    Fig. 7.
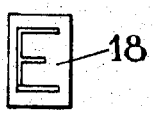    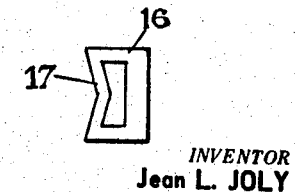
INVENTOR
Jean L. JOLY
BY
ATTORNEY

# United States Patent Office 3,450,828
Patented June 17, 1969

3,450,828
TERMINAL PIECE FOR THE CONNECTION OF ELECTRICAL CABLES
Jean L. Joly, Houilles, France, assignor to La Telemicanique Electrique, Nanterre, France
Filed Oct. 17, 1966, Ser. No. 587,229
Claims priority, application France, Oct. 20, 1965, 35,521
Int. Cl. H02g 15/02
U.S. Cl. 174—75                        6 Claims The present invention relates to a terminal piece for electrical cable that will facilitate the laying of this cable in an insulating sheath at the location of its connection and to improve the sturdiness of the cable as well as the insulating property of its sheath. It is known that in electrical equipment for industry, transports, telecommunications, etc. . . . it is often preferred to use cables made up of multi-strand conductors which are more flexible than single-strand cables and which, besides, better resist breaking when subjected to vibrations. However, multi-strand conductors have the disadvantage that they are more difficult to connect to terminals and require the use of connecting lugs. According to a well known technique, said connecting lugs generally have a ferrule clamped around the end of the sheath of the cable whereas the conductor strands are crimped on the body of the lug, the latter having eye pieces or prongs to be clamped to the terminal. But in the case of devices having several closely spaced terminals or when it is intended to connect several conductors to the same terminal, the lugs are often too cumbersome. It has already been suggested to simply cover the extreme end of the cable, stripped of its insulating sheath, with a tube or cap forming a case in which the multiple strands are received, thus obtaining a junction device that requires less space than the lugs. The tube is malleable and collapses partially in the clamping area of the terminal or of the connector; it is besides provided at the base thereof with a small funnel that eases the insertion of the conductor strands in the said case. Other difficulties however remain. When the conductor which is secured to the terminal has to be bent, for instance to reach a strand-guiding channel, the more or less flared tube base bears on the conductor which, when subjected to vibrations, may begin to break at that location. Furthermore, this flaring portion of the tube may protrude outside the junction device and thus constitute an electrically dangerous metal part.

The present invention overcomes this disadvantage and further provides a more improved way of securing index or coding tabs on the conductor sheath.

According to the invention, the terminal piece intended to be secured at the end of the multi-strand cable, previously stripped of its sheath along a short distance, comprises a tube made of a malleable metal having a length slightly shorter than the said distance and an inner diameter just sufficient for sliding the strand of the cable wires in, the said tube being extended at the base by a flaring collar, a short portion of the said base and the collar being embedded inside an insulating ring, preferably made of plastic material, this ring extending rearwardly to form a sleeve adapted to be mounted on the terminal end of the insulating sheath of the cable that it supports. The inside of the sleeve is advantageously provided with several ribs having the shape of elongated cone portions flexibly collapsed over the cable sheath.

According to a particular embodiment of the invention, the ring of plastic material is provided with an arm solid therewith, this arm being in the form of a bar over which a certain number of coding tabs made like small dice are slid. Preferably, the arm is a rectilinear bar parallel to the axis of the ring and the bar defines at the end thereof a small hook-like ramp in such a manner that the coding dice, having a bore corresponding to the cross-section of the bar are forced onto the bar and retained thereon by the hook.

The invention will be better understood by reference to the following description having reference to the appended drawing, given by way of non-limitative example, the features derived from the text as well as from the drawing being of course part of the said invention. In the drawing:

FIG. 1 is a perspective view illustrating the mounting of cables provided with terminal pieces of the invention mounted on electrical terminals;

FIG. 2 is a longitudinal cross-section of the terminal piece;

FIG. 3 is a cross-section taken along line III—III of FIG. 2;

FIG. 4 is an elevation view of a second embodiment of the invention comprising a coding arm;

FIG. 5 is an end view of FIG. 4;

FIG. 6 is a front view of a coding dice;

FIG. 7 is the end view of the same dice.

The terminal pieces of the invention are illustrated in FIG. 1 in their position of use, that is, in the joining of two cables over a conventional terminal. This terminal essentially comprises a bus bar 1 having screws, each clamping one small plate 3. The cables, stripped of their insulating sheath, are clamped between plate 3 and bar 1. Protection means against accidental contacts is obtained by insulating walls 4, 4a, the latter being shown partially broken away to illustrate the otherwise hidden structure. The walls comprise parts 4b projecting from the body 5 of the terminal support. The terminal piece that houses the multi-strand cable and its sheath is generally designated by numeral 10. In FIG. 1, it is seen that the sleeve-like rear portion capping the cable sheath begins immediately outside the clamping plate and, besides, holds the cable sheath, the said sheath being bent towards the base of the terminal. This sleeve which is made of insulating material and the construction of which will be detailed hereinafter, will not allow any accidental contact and takes very little space. Besides, it is shown at 20 that the sleeve is provided with an arm carrying marking indices readily showing the advantage of this device.

The structural features of the terminal piece of the invention is shown in FIG. 2. It comprises a tube 6, made of red copper for instance, having a terminal flared portion 6a. The base of the tube and the portion 6a are solidly connected to the ring 7 made of insulating material, preferably a superpolyamide plastic material. When plastic material is used, it is easy to connect the portion 6a with the ring 7 by the following method. Briefly, the tube is disposed in a mold in which the material in liquid state is sent under pressure. When cooled, the portion 6a is solidly embedded in the ring 7. The latter projects rearwardly to form a sleeve 7 intended to support the cable sheath. The bore 9 of the sleeve is cylindrical and of a diameter corresponding to the normal diameter of the cable to which the terminal piece is to be adapted. However, in order to improve the clamping, inner ribs 8 are provided, three being shown as an example. These ribs have the form of a conical wedge, their end in the direction opposite that of tube 6 ending in a point having the normal diameter of the bore 9. The exterior shape of sleeve 7 is advantageously that of a cone for esthetic purposes as well as to facilitate molding.

The use of such a terminal piece is extremly simple. Having stripped the cable of an adequate portion of its sheath in such a manner as to free the conductor strands on a length slightly greater than the length L necessary for securement on the terminal (see FIG. 1), the terminal piece is slid over the cable strands until the bottom of bore 9 reaches the cut end of the cable sheath. The presence of ribs 8 makes it necessary to slightly force the engagement of the terminal piece over the sheath. Thereafter, tube 6 is slide under the clamping plate 3 of the terminal. When the terminal is clamped, tube 6 collapses a little and becomes integral with the conductor strands. It can be seen from FIG. 2 that the end 6a of the tube is very well protected by the ring 7 against accidental contacts and that the sleeve 7a adequately protects the sheath against shocks and external traction forces.

FIG. 4 illustrates how ring 7 may be used to support a coding device. It should be noted here that in the usual lug devices, it is deemed satisfactory to insert one or several small rings around the cable before setting of the lug. The coding of the conductors can therefore take place only before mounting. With the invention, to the contrary, the arm 20 makes it possible to receive coding tabs after the cable is connected. It is therefore no longer necessary for the workmen making the cabling to have in advance cable portions that are adequately cut, marked with tabs and provided with lugs. The use of terminal pieces with coding means, according to the invention, thus constitutes an important saving in the cabling of electrical equipment.

It is obvious that the arm 20 may receive, during molding of the plastic material, any desired shape to receive coding markers and dispose them for easy reading. In a preferred embodiment according to FIG. 4, the arm 20 has the shape of a straight bar having a rectangular cross-section and is connected to the ring by a part 11. The bar ends with a part having two slopes 12 and 13 separated by a rounded apex. Slope 12 defines in relation to the inner face 15, a shoulder 14. The straight bar 20 is generally parallel to the axis of the terminal piece. It is possible to slide coding dice 16 over said bar, the dice being made of molded material and generally having the shape of a loop, the forward face 18 of which is flat whereas the rear face 17 is concave, thus giving a flexible clamping effect at the center. Each face 18 may be hot-marked with a figure or a letter. Referring to FIG. 1, it can be seen how the coding dice, after being slid over bar 20, are available for reading. Hook 14 retains the dice mounted on the bar 20. It will further be noted that in the improved device of the invention, the coding tabs may not rotate and thus always remain perfectly readable contrary to the actual system wherein coding rings are mounted on the cable sheath.

Modifications can of course be made to the above-described embodiments without departing from the spirit of the present invention, particularly by various molding shapes for the ring which is part of the terminal piece or by any other means for joining the ring and the tube.

I claim:
1. A terminal secured to a stranded electrical conductor comprising:
    (a) a stranded electrical conductor with an insulating sheath covering thereon,
    (b) a portion of said insulating sheath being stripped a predetermined distance,
    (c) a tube of malleable metal having an inner diameter slightly larger than the stripped stranded conductor, said tube being relatively thin and collapsed over said stripped stranded conductor,
    (d) a terminal flared portion at one end of said tube,
    (e) an insulating ring having said terminal flared portion embedded therein,
    (f) a sleeve having an internal diameter approximately corresponding to the outside diameter of said insulating sheath portion and projecting from said ring, and
    (g) rib means on said sleeve frictionally gripping said insulating sheath portion.

2. A terminal secured to a stranded electrical conductor comprising:
    (a) a stranded electrical conductor with a covering of insulating sheath thereon,
    (b) a portion of said insulating sheath being stripped a predetermined distance,
    (c) a tube of relatively thin malleable metal having an inner diameter slightly larger than the stripped stranded conductor,
    (d) a terminal flared portion at one end of said tube,
    (e) an insulating ring having said terminal flared portion embedded therein,
    (f) a sleeve projecting from said ring and gripping said insulating sheath portion,
    (g) a handle-like arm projecting from said insulating ring for mounting conductor coding tabs.

3. The combination of claim 2, wherein said arm is a straight rectangular bar parallel to the axis of said ring forming a body flange of said ring.

4. The combination as claimed in claim 2, wherein said arm is formed at the free end thereof with a coding tab retaining hook.

5. The combination as claimed in claim 2, including coding tabs in the form of rings having a square bore assembled on said arm.

6. The combination of claim 5, wherein said coding rings have a marking face and a concave face opposite said marking face.

References Cited

UNITED STATES PATENTS

| | | | |
|---|---|---|---|
| 2,533,200 | 12/1950 | Rogoff. | |
| 2,823,249 | 2/1958 | Curtiss | 174—87 |
| 3,135,571 | 6/1964 | Klinkwitz | 339—218 XR |

FOREIGN PATENTS

| | | |
|---|---|---|
| 625,732 | 9/1961 | Italy. |

DARRELL L. CLAY, Primary Examiner.

U.S. Cl. X.R.

174—90, 112, 135; 339—113, 223, 276